United States Patent [19]

Thompson

[11] 3,723,573

[45] Mar. 27, 1973

[54] PROCESS FOR PREPARING UNSATURATED POLYESTER

[75] Inventor: Robert M. Thompson, Wilmington, Del.

[73] Assignee: Sun Research and Development Co., Philadelphia, Pa.

[22] Filed: Nov. 11, 1971

[21] Appl. No.: 197,983

[52] U.S. Cl. .........260/866, 260/75 EP, 260/78.4 EP, 260/861, 260/864
[51] Int. Cl. ...........................C08f 21/02, C08g 17/12
[58] Field of Search ....260/866, 861, 78.4 EP, 75 EP

[56] References Cited

UNITED STATES PATENTS

| | | | |
|---|---|---|---|
| 2,610,168 | 9/1952 | Anderson | 260/866 X |
| 2,632,753 | 3/1953 | Anderson | 260/866 |
| 2,822,350 | 2/1958 | Hayes | 260/78.4 |
| 3,254,060 | 5/1966 | Connolly et al. | 260/78.4 |
| 3,374,208 | 3/1968 | Seiner et al. | 260/78.4 |
| 3,375,301 | 3/1968 | Case et al. | 260/869 |
| 3,483,169 | 12/1969 | Case et al. | 260/78.4 |

*Primary Examiner*—William H. Short
*Assistant Examiner*—E. Nielsen
*Attorney*—George L. Church et al.

[57] ABSTRACT

An unsaturated polyester is prepared via an epoxide-anhydride process wherein the copolymerization occurs in the presence of a reactive diluent, initiator, mild catalyst and a free radical inhibitor at a temperature of 20°C. – 175°C.

21 Claims, No Drawings

PROCESS FOR PREPARING UNSATURATED POLYESTER

BACKGROUND OF THE INVENTION

The following is typical of the epoxide-anhydride process for preparing unsaturated polyesters. Propylene oxide, maleic anhydride and phthalic anhydride are reacted at 95°C. – 125°C. for 3 – 8 hours in the presence of a catalyst and an initiator. At this temperature, the isomerization of the maleate structure to the more reactive fumarate form is not favored unless a suitable catalyst is used. So, after the copolymerization is completed, post heating at 190°C. – 230°C. for 2 – 5 hours is performed to effect isomerization. After the copolymerization is completed, the unsaturated polyester, in part, because of its high viscosity, is diluted with a reactive diluent, e.g., styrene. This diluent also enters into a cross-linking reaction which enhances the ultimate use product, e.g., a boat hull. Also to the diluted unsaturated polyester is added a free radical inhibitor to prevent the styrene from homopolymerizing. This process is described in U.S. Pat. No. 3,254,060, issued May 31, 1966.

The aforementioned diluent serves two functions: (1) adjusts the viscosity of the unsaturated polyester to the desired fluidity which facilitates ease of handling and (2) coreacts with the polyester unsaturation to achieve rapid and complete final cure to a cross-linked high strength product. The reactive diluent is usually a vinyl monomer. An example of one used commercially in great quantities is styrene. Others are listed in *ENCYCLOPEDIA OF CHEMICAL TECHNOLOGY*, Kirk-Othmer, 2nd Edition, Vol. 20, section "Unsaturated Polyesters." The addition of a reactive diluent to the unsaturated polyester, such as styrene, creates a problem since the latter is very susceptible to homopolymerization. Styrene is known to be highly susceptible to homopolymerization, catalyzed by ionic or free radical systems. Styrene polymerization is also known to be initiated thermally at a temperature as low as 60°C. Also, the dilution of the unsaturated polyester with the reactive diluent required an extra processing step which is time consuming and requires additional heating.

The thermosetting composition; i.e., the mixture of the unsaturated polyester and the reactive diluent, resulting from the aforementioned typical epoxide-anhydride process can be cast or molded into a desired shape. Other additives, such as a filler, colorant, mold and release agent, antioxidants, antistatic, flame retardants, ultraviolet stabilizers, etc. can be incorporated into the thermosetting composition prior to the application of heat and/or catalyst to convert the liquid to a solid. Methods of forming desired polyester shapes, as well as the various additives and conversion catalysts, are described in the aforementioned encyclopedia.

The finished thermosettable product is shaped by fabricators. The methods of fabrication include compression or match-metal die molded, laminated, pultruded, filament wound, transfer molded, bag molded, drape molded, sprayed-up, hand layed up and cast. These fabrication methods are defined in the trade literature, for example, *MODERN PLASTICS ENCYCLOPEDIA*, 1970/1971, page 194. Since most of these applications for unsaturated polyesters require rapid conversion from a liquid to a completely cured solid state, it is necessary to accelerate the cure by the addition of unstable substances that produce free radicals and/or heating the mixture or some other means of generating free radicals. Curing refers to the final cross-polymerization of the unsaturated polyester with the reactive diluent, the latter being the cross-links between the ester molecules.

SUMMARY OF THE INVENTION

Present epoxide-anhydride process relates to the preparation of an unsaturated polyester by a copolymerization reaction taking place in contact with a reactive diluent, mild catalyst, an initiator, and free radical inhibitor at a temperature of about 20°C. – 175°C. without substantial polymerization of the reactive diluent. This one-step copolymerization method avoids the time and heat consuming step of the conventional practice of subsequently diluting the viscous unsaturated polyester with the reactive diluent. Operable amounts of reactants, diluent, catalyst and other materials are specified.

DESCRIPTION

In the preparation of an unsaturated polyester via the epoxide-anhydride method defined herein, three reactants are copolymerized. One of the reactants is an anhydride of an ethylenically unsaturated dicarboxylic acid or a mixture of such anhydrides. Another reactant is an anhydride of an alkylene or arylene dicarboxylic acid or a mixture of such anhydrides. The third reactant is an epoxide or a mixture of epoxides.

The anhydride of an ethylenically unsaturated dicarboxylic acid refers to a reactant which can be represented by the following structure:

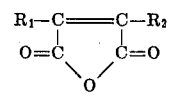

wherein each of $R_1$ and $R_2$ can be H or an organic radical containing 1 – 20 carbon atoms. Preferably, each of $R_1$ and $R_2$ is an H or an alkyl radical containing 1 – 10 carbon atoms and more preferably, each of $R_1$ and $R_2$ is an H or alkyl radical containing 1 – 5 carbon atoms. When $R_1$ and $R_2$ are H, then the reactant is maleic anhydride which is highly preferred.

The anhydride of an alkylene dicarboxylic acid refers to a reactant which can be represented by the following structure:

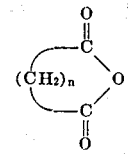

wherein $n = 2$ to 20. A few examples are succinic, glutaric and adipic anhydrides. Alkylene dicarboxylic anhydrides wherein $n = 2$ to 5 are preferred.

The anhydride of an arylene dicarboxylic acid refers to a reactant which can be represented by the following structure:

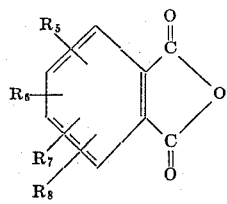

wherein each of $R_5$, $R_6$, $R_7$ and $R_8$ is an H or an organic radical containing 1 – 20 carbon atoms. Preferably, at least three of the aforementioned R's are H's and the remaining R is H or an organic radical containing 1 – 10 carbon atoms; more preferably the remaining R is H or an alkyl radical containing 1 – 5 carbon atoms. When the four R's are H, the resulting reactant is phthalicanhydride which is highly preferred.

The third reactant is an epoxide which is a material incorporating a three membered ring containing one oxygen atom and two carbon atoms, i.e.,

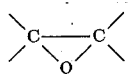

. The simplest member of the series is ethylene oxide. While propylene oxide is the preferable epoxide, other epoxides such as ethylene oxide and butylene oxide can be substituted therefore in whole or in part. Other epoxides can be used such as styrene oxide and α - methyl styrene oxide.

The operable amounts of the three aforementioned reactants in contact with each other are as follows. The mole ratio of (A), a substance selected from the group consisting of an anhydride of an ethylenically unsaturated dicarboxylic acid and a mixture of said anhydrides, to (B), a substance selected from the group consisting of anhydride of alkylene dicarboxylic acid, mixture of said alkylene anhydride, anhydride of arylene dicarboxylic acid, mixture of said alkylene anhydrides and a mixture of said alkylene and arylene anhydride, is in the range of about 0.7 – 1.5. A preferable range is about 0.9 – 1.25 and more preferable is about 0.95 – 1.1. The mole ratio of (C), a substance selected from the group consisting of epoxide and mixture of epoxides, to (A) plus (B), is about 0.8 – 1.2; a preferable range is about 0.9 – 1.1.

The aforementioned reactants are brought together, along with other materials described hereinafter, at an operable temperature of about 20°C. – 175°C; a preferable range is about 30°C. – 150°C.

While these reactants will copolymerize without a catalyst, the rate of reaction is rather slow for commercial use. Thus these reactants are brought together in the presence of a catalyst selected from the group consisting of alkali metal salts, alkaline earth metal salts and salts of organic amines. This group of catalyst is referred to herein as a "mild catalyst"; this contrasts it with "strong" catalyst which refers to alkali metal hydroxides, alkaline earth metal hydroxides and hydroxides of organic amines.

In practicing the present invention, the aforementioned mild catalysts are operable; preferable mild catalysts are the chlorides and bromides of Group I and II elements. The weight ratio of catalyst that can be employed to weight of the reaction mixture is about 0.01 – 5, preferably 0.05 – 2.5.

In addition to the aforementioned catalyst, an initiator must be included in the reaction mass. The initiator helps in getting the reaction started and acts to regulate the molecular weight of the resulting unsaturated polyester. The initiator can be a hydroxyl containing substance such as water, alcohol and glycol. The amount of initiator employed with reaction mass depends, in part, upon the desired molecular weight, however, the typical mole ratio of initiator to reactants is 0.01 – 0.10, with 0.02 – 0.08 preferred.

The molecular weight of the resulting unsaturated polyester can be as low as 200 or as high as 800 – 5,000. Too low a molecular weight increases the curing time of the thermosettable product, while too high a molecular weight, which causes the thermosettable product to have a high viscosity, causes handling problems for the ultimate fabricator. Thus a more desirable molecular weight range is about 1,000 – 3,000.

Surprisingly, it has been found that the reactants as defined herein can be copolymerized to an unsaturated polyester in the presence of the reactive diluent with only a minimal amount of reactive diluent homopolymerization or cross-linking. Thus, for example, it is possible to form an unsaturated polyester from propylene oxide, maleic anhydride and phthalic anhydride in the presence of styrene without seriously affecting the properties of cured product.

In practicing the present invention, the mole ratio of reactive diluent to the aforementioned reactant (A) is in the range of about 2 – 3; a preferable range is about 2.25 – 2.75.

To minimize the homopolymerization of the susceptible reactive diluent, a free radical inhibitor is also added to the reaction mixture. In the typical processing sequence, such an inhibitor would be incorporated, along with the reactive diluent, with the unsaturated polyester after the reactants had copolymerized. However, in the present invention, the inhibitor is added, along with the reactive diluent, to the reaction mixture before the copolymerization has taken place.

One example of a class of free radical inhibitors are the quinones; benzoquinone being particularly effective. These free radical inhibitors are discussed in greater detail in the aforementioned encyclopedia.

The amount of free radical inhibitor used depends on the amount of the reactants and other components. The weight of free radical inhibitor to the weight of (A) plus (B) plus (C) plus initiator plus reactive diluent plus catalyst is in the range of about 0.01 – 0.20; preferably 0.02 – 0.10.

The present invention can be practiced in either a batch or continuous process; the former being preferred.

After the aforementioned reactants, mild catalyst, initiator, reactive diluent and free radical inhibitor have been contacted at 20°C. – 175°C. until the desired molecular weight has been obtained, the resulting finished thermosettable product can be used immediately or cooled and stored until needed or shipped from the producer to the fabricator.

The curing of the thermosettable product is effected by the application of heat and/or pressure in the presence of a free radical yielding catalyst. Catalysts that may be used for the curing or polymerization are preferably the peroxide catalysts such as benzoyl peroxide, lauroyl peroxide, t-butyl hydroperoxide, methyl ethyl ketone peroxide, t-butyl perbenzoate, potassium persulfate, 2,5-dimethyl-2,5-bis (2-ethyl hexanoylperoxy) hexane and the like. The amount of the catalyst added will vary preferably from 0.1 percent to about 5 percent by weight of reactants. Temperatures employed may vary over a considerable range but usually are in the range of 40°C. – 150°C.

Additionally, more rapid curing of the thermosetting resin compositions may be accomplished by the addition of accelerating agents such as lead or cobalt naphthenate, dimethyl aniline and the like usually in concentrations ranging from 0.1 – 5.0 weight percent.

In order to further illustrate the invention, the following example is given, along with comparative runs.

EXAMPLES

The results of eight runs are reported in the accompanying Tables I and II. Runs 1 and 2 were comparative runs wherein the copolymerization did not take place in the presence of a reactive diluent. In Runs 3 – 8, the copolymerization took place in the presence of a reactive diluent. Run 8 is an example of the invention. Runs 3 – 7, by comparison with Run 8, indicate the criticality of the amounts of the reactants and other materials used in Run 8.

The general procedure for preparing the unsaturated polyester of Runs 3 – 8, shown in the accompanying Tables I and II, was as follows. In Run 3 a one liter Parr reactor equipped with a low shear stirrer; i.e., a slow paddle stirrer, after being pressure tested, was charged with 0.87 gram moles of maleic anhydride, 1.93 gram moles of phthalic anhydride, 0.22 gram moles of propylene glycol, 1.1 grams of lithium chloride, 0.013 gram moles of benzoquinone and 1.3 gram moles of styrene. The reactor was purged of air by pressurizing with 40 psig nitrogen three times. After the last pressurizing, the pressure of the reactor was reduced to 4 psig and then 1.5 gram moles of propylene oxide were charged through a Jergensen gauge under 10 psig pressure. Afterwards, the reactor was pressurized with nitrogen to 40 psig and then heated to a temperature of 90°C. and maintained at that temperature for 6 hours. During the 6 hours, the reaction mixture was continuously stirred. The reaction was followed by the changes in apparent acid number of withdrawn samples of the reaction mixture.

Thus, for example, the apparent acid number of Run 3 changed with time as shown hereinafter:

| Time | Apparent Acid No. |
|---|---|
| 3.0 hours | 68 |
| 4.0 hours | 58 |
| 5.5 hours | 49 |
| 6.0 hours | 48 |

Since only a small change occurred in the apparent acid number during the last half an hour, the reaction was about completed and thus the heat discontinued. The reaction mixture was poured hot into a container and stored under nitrogen until cooled.

Apparent acid number measurement indicates the amount of polymerization and can be used to follow the reaction as it proceeds. The commercially acceptable acid range is about 20 – 50.

Also shown in Table I, under Item 2, Copolymerization Conditions, is G – H Vis. This is a viscosity measurement which reflects molecular weight of unsaturated polyesters at a specified concentration of monomer. The unsaturated polyester solutions are compared with a series of viscosity standards assigned a letter and increasing from A – Z. then Z–1 to Z–6. The G – H viscosities usually obtained for unsaturated polyester esters dissolved in 30 mole percent styrene range from Z–1 to Z–3. Several runs; namely, 1 and 2, were made for comparison of operating conditions and physical properties of the cured polyester. The procedure for Runs 1 and 2 was different in that in Run 1 no reactive diluent was present in the reactor during the copolymerization. Also, after Run 1 was completed and about half of the reaction mixture was removed from the reactor, the remaining reaction mixture was heated to the higher temperature shown in Table 1 for Run 2. Thus, the reaction mixture of Run 2 was first subjected to a heating at a temperature of 90°C. for 5 hours in addition to the three hours at 210°C.

The general procedure for curing the unsaturated polyesters of Runs 1 – 7, shown in Table I, was as follows. The specified amount of cure catalyst was dissolved in the unsaturated polyester-styrene solution. In some cases this required first warming the solution. The resulting solution was poured into molds made from stainless steel plates, 3 × 5 inches using a ⅛ inch spacer and a C clamp was used to hold them together. Cellophane was used as a mold release. The molds were cured in an oven at 55°C. for 16 hours and then the temperature was increased over 30 minutes to 110°C., after which it was maintained at that time for 2 hours. The molds were removed from the oven and allowed to cool. Subsequently, the molded cured polyester was subjected to the various physical tests shown in Table I.

Comparison of the physical properties of the cured polyester product of Runs 1 and 2 illustrated the improvement caused by post heating to effect isomerization of the maleate structure. Thus, in Run 1, the cured polyester was too brittle to measure its hardness, whereas the cured polyester of Run 2 had a satisfactory hardness.

The physical properties of the cured polyester products of Runs 3 – 7 were unsatisfactory in comparison to the product of Run 2.

Hardness versus curing time of the polyester-styrene product of Run 8 was obtained as shown in Table II. This data shows that a polyester-styrene product can be prepared by this invention wherein the cured product has a satisfactory hardness. The other physical properties of the cured product were believed to be satisfactory because of the reported physical properties of the uncured polyester product. For comparative purposes, a commercially available thermosettable product was treated in a similar manner.

TABLE I

Operating conditions used to prepare unsaturated polyesters

| Materials and conditions | Runs | | | | | | | |
|---|---|---|---|---|---|---|---|---|
| | 1 | 2 | 3 | 4 | 5 | 6 | 7 | 8 |
| 1. Reactants:[a] | | | | | | | | |
|   Maleic anhydride | 0.93 | | 0.87 | 0.87 | 0.93 | 1.12 | 1.12 | 1.4 |
|   Phthalic anhydride | 1.87 | | 1.93 | 1.93 | 1.87 | 1.68 | 1.68 | 1.4 |
|   Propylene oxide | 2.58 | | 1.5 | 1.33 | 2.8 | 2.8 | 2.8 | 2.8 |
| 2. Initiator:[a] Propylene glycol | 0.35 | | 0.22 | 0.22 | 0.175 | 0.175 | 0.175 | 0.175 |
| 3. Catalyst, grams: | | | | | | | | |
|   LiCl | | | 1.1 | | | | 1.1 | 1.1 |
|   BDA[b] | | | | 0.1 | | 0.1 | | |
|   TMAB[c] | 0.1 | | | | 0.1 | | | |
| 4. Free radical inhibitor:[k] Benzoquinone | | | 0.013 | 0.013 | 0.013 | 0.04 | 0.04 | 0.04 |
| 5. Reactive diluent:[a] Styrene | | | 1.3 | 1.3 | 1.86 | 2.24 | 2.24 | 3.5 |
| 6. Copolymerization conditions: | | | | | | | | |
|   Temperature, °C | 90 | [2]210 | 90 | 90 | 90 | 100 | 100 | 100 |
|   Time, hours | 5 | 3 | 6 | 6 | 8 | 6.7 | 6.3 | 6 |
|   Acid No. | 35 | 30 | 29 | 40 | 17.5 | 9.8 | 8.3 | 38 |
|   G-H vis | X-Y | X-Y | Z | Y-Z | Z-Y | Z-Z | >Z-6 | V-W |
|   G color | 10-11 | 16-17 | 0-1 | 4-5 | >18 | >18 | ~14 | 12 |
|   $\overline{M}_N$ calc.[h] | 1,560 | 1,560 | 1,630 | 1,370 | 3,000 | 3,400 | 3,400 | |
| 7. Cured polyester product: | | | | | | | | |
|   Cure catalyst and wt. percent[d] | BP/3 | BP/3 | BP/3 | BP/3 | BP/3 | BP/3, MEK/3 | MEK/3 | ([l]) |
|   Clarity[e] | C | C | O | T | T | C | C | C |
|   Extractables, wt. percent[i] | | 2.8 | 16 | 5 | 2.6 | | | |
|   Barcol hardness[f] | TB | 47 | TB | TB | TB | TB | TB | ([l]) |
|   Flexural strength, p.s.i.[g] | | | TS | TS | 2,380 | | | |
|   Flexural modulus, M p.s.i | | | | | 318 | 236 | | |

[a] Gram moles.
[b] BDA = benzyldimethylamine.
[c] TMAB = tetramethylammonium bromide.
[d] BP = benzoyl peroxide, MEK = methylethyl ketone peroxide.
[e] C = clear, D = opaque, T = translucent.
[f] TB = too brittle; the larger the number, the better product, satisfactory cured polyesters have range of 30-55.
[g] TS = too soft.
[h] Molecular weight, calculated from initiator concentration.
[i] Mg. KOH/g. sample.
[j] Low molecular weight polyester.
[k] Weight percent; i.e., weight of inhibitor to weight of reactants plus initiator plus reactive diluent.
[l] See Table II.
[2] Run 2 is material from Run 1 after completion of Run 1.

TABLE II

[Comparison of cured polyester products]

| Thermosettable product | Curing catalyst, weight percent[b] | Barcol hardness after following minutes | | | | | | |
|---|---|---|---|---|---|---|---|---|
| | | 2 | 5 | 10 | 15 | 30 | 45 | 60 |
| Commercially prepared[a] | 0.4 | 29 | 34 | 39 | 43 | | | |
| Run 8 | 0.4 | | | 0 | 24 | | | |
| Commercially prepared[a] | 0.8 | | 0 | 44 | 45 | 47 | 47 | 48 |
| Run 8 | 0.8 | | | 0 | 35 | 35 | 37 | |

[a] Material made from via the usual polyesterfication process.
[b] 2,5-dimethyl-2,5-bis(2-ethylhexanoylperoxy)hexane.

The invention claimed is:

1. A process for the preparing of an unsaturated polyester comprising:

contacting together at a temperature of about 20°C. - 175°C. the following: (A) a substance selected from the group consisting of an anhydride of an ethylenically unsaturated dicarboxylic acid and a mixture of said anhydrides; (B) a substance selected from the group consisting of anhydride of alkylene dicarboxylic acid, mixture of said alkylene anhydrides, anhydride of arylene dicarboxylic acid, mixture of said arylene anhydrides and a mixture of said alkylene and arylene anhydride; and (C) a substance selected from the group consisting of epoxide and mixture of epoxides;

said contacting occurring in the presence of a mild catalyst selected from the group consisting of alkali metal salts, alkaline earth metal salts, and salts of organic amines, an initiator, a reactive diluent which is a vinyl monomer, and a free radical inhibitor;

and thereafter agitating said contacting materials at said temperature until a desired molecular weight is obtained;

the amounts of (A) and (B) being such that the mole ratio of (A) to (B) is about 0.7 - 1.5; the amount of (C) being such that the mole ratio of (C) to (A) plus (B) is about 0.8 - 1.2; the amount of reactive diluent being such that the mole ratio of said diluent to (A) is about 2 - 3; the amount of free radical inhibitor being such that the weight of said inhibitor to weight of (A) plus (B) plus (C) plus initiator plus reactive diluent plus catalyst is about 0.01 - .20; the amount of catalyst being such that the weight ratio of said catalyst to the reaction mixture is about 0.01 - 5.0; and, the amount of initiator being such that the mole ratio of initiator to (A) plus (B) plus (C) is about .01 - 0.10.

2. Method according to claim 1 wherein the ratio of (A) to (B) is about 0.9 - 1.25.

3. Method according to claim 1 wherein the ratio of (C) to (A) plus (B) is about 0.9 - 1.1.

4. Method according to claim 1 wherein the ratio of reactive diluent to (A) is about 2.25 - 2.75.

5. Method according to claim 1 wherein the temperature is about 30°c. - 150°C.

6. Method according to claim 1 wherein the reactive diluent is styrene.

7. Method according to claim 1 wherein the free radical inhibitor is a quinone.

8. Method according to claim 1 wherein the mild catalyst is one of the following: chloride of Group I element, chloride of Group II element, bromide of Group I element and bromide of Group II element.

9. Method according to claim 1 wherein the initiator is a glycol.

10. Method according to claim 1 wherein the molecular weight of the unsaturated polyester is 200 - 5,000.

11. Method according to claim 2 wherein (A) is maleic anhydride.

12. Method according to claim 11 wherein (B) is phthalic anhydride.

13. Method according to claim 3 wherein (C) is propylene oxide.

14. Method according to claim 4 wherein the reactive diluent is styrene.

15. Method according to claim 5 wherein the ratio of (A) to (B) is about 0.9 – 1.25; the ratio of (C) to (A) plus (B) is about 0.9 – 1.1; the ratio of reactive diluent to (A) is about 2.25 – 2.75 and weight of inhibitor is about 0.02 – 0.10.

16. Method according to claim 15 wherein the free radical inhibitor is a quinone; the mild catalyst is one of the following: chloride of Group I element, chloride of Group II element, bromide of Group I element, bromide of Group II element; and the initiator is a glycol.

17. Method according to claim 16 wherein (A) is maleic anhydride, (B) is phthalic anhydride, (C) is propylene oxide and the reactive diluent is styrene.

18. Method according to claim 17 wherein the quinone is benzoquinone, the mild catalyst is lithium chloride, and the glycol is propylene glycol.

19. Method according to claim 18 wherein the method is a batch process.

20. Method according to claim 19 wherein the molecular weight of the unsaturated polyester is 1,000 – 3,000.

21. Method according to claim 19 wherein the method is a continuous process.

* * * * *